March 3, 1970      A. J. ELDERS      3,497,964
ELECTRONIC CONTROL CIRCUIT FOR A DRYER
Filed Dec. 18, 1967      3 Sheets-Sheet 1
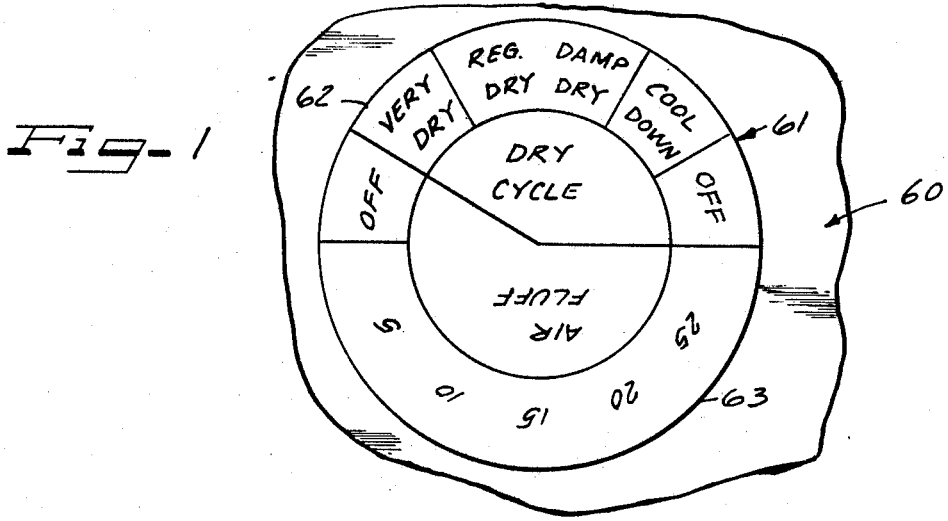
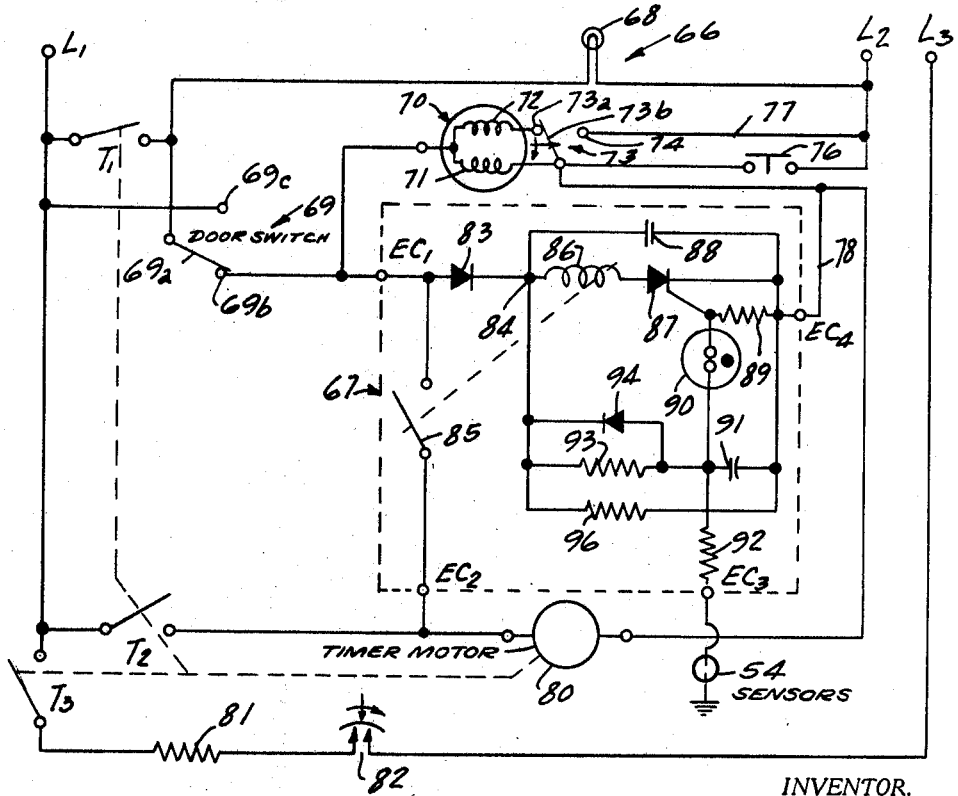
INVENTOR.
ALVIN J. ELDERS
ATTORNEYS

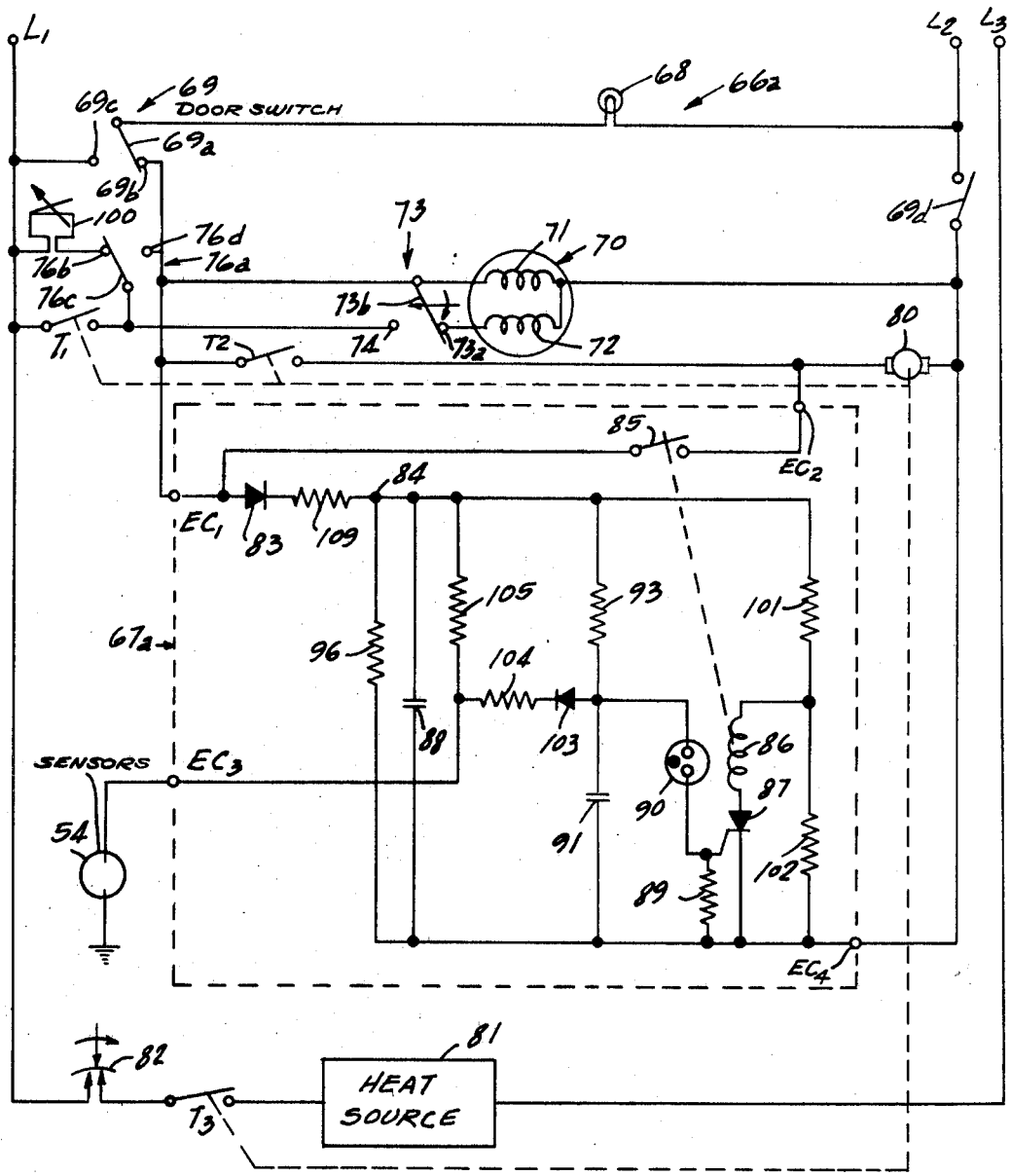

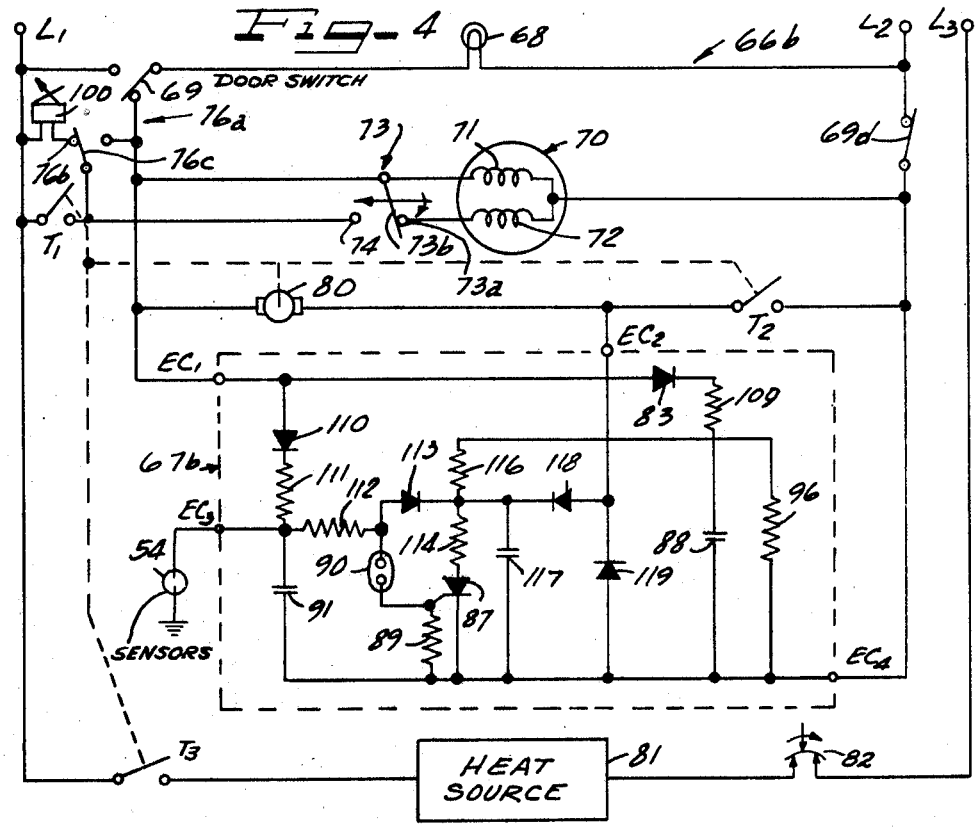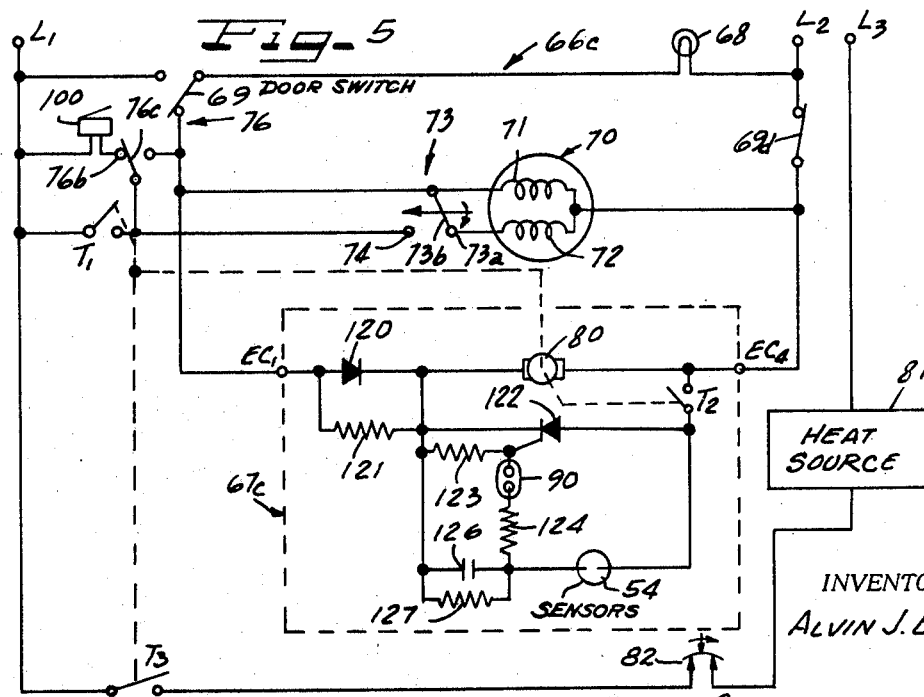

United States Patent Office 3,497,964
Patented Mar. 3, 1970

3,497,964
ELECTRONIC CONTROL CIRCUIT FOR A DRYER
Alvin J. Elders, Lincoln Township, Berrien County, Mich., assignor to Whirlpool Corporation, St. Joseph, Mich., a corporation of Michigan
Filed Dec. 18, 1967, Ser. No. 691,351
Int. Cl. F26b 25/22
U.S. Cl. 34—45                                 6 Claims

ABSTRACT OF THE DISCLOSURE

This invention is directed to a control system for an appliance wherein a sensor is associated with the appliance to provide a current path whose resistance is proportional to a sensed condition within the appliance. The control system includes an electronic control circuit which generates a control signal in response to a predetermined value of the sensed condition. Selectable timer means having a plurality of preprogrammed sequential cycles of operation is connected to the control circuit for operation therefrom when the timer means is in one of its preselected cycles of operation. The control circuit includes a switch which is operated by the timer and connected in circuit with the electronic control circuit to disable the electronic control circuit when the timer is in another preselected sequential cycle of operation. One form of the electronic control circuit associated with the control system of the present invention utilizes a silicon controlled rectifier having a sensor connected in series with the gate to cathode junction thereof to develop a firing potential across the gate to cathode junction in response to the sensor sensing a predetermined value of the sensed condition. The voltage level on a capacitor of relatively low capacitance value connected in the gate circuit of the silicon controlled rectifier is controlled by the sensor in response to the sensed condition.

BACKGROUND OF THE INVENTION

Field of the invention

This invention relates generally to a control system for an appliance and more particularly to a control system for a clothes dryer wherein sensing elements are placed within the clothes receptacle of the dryer to sense the relative condition of dryness of the clothes. Although the present invention has utility when used in conjunction with any dryer construction, a particularly useful application is made to dryers of the type described in U.S. application Ser. No. 425,302; filed Jan. 13, 1965, now U.S. Patent No. 3,391,468 and assigned to the assignee of the present invention.

Description of the prior art

Heretofore, control systems for clothes dryers incorporated devices such as timer motors which were set for a predetermined time interval dependent upon the relative dryness desired. This type of control system would not compensate for the water retention characteristics of the clothes being dried, and therefore some clothes would be more dry than others at the end of the preselected time. Additionally, more elaborate control systems of the prior art included electronic sensing means having a sensor positioned within the drum to control operation of an electronic circuit which would terminate the drying cycle of operation. Such control systems depended on clothing striking the sensor on nearly every revolution of the drum if the sensor was to do an effective job. On the damp dry setting, if small loads were being dried, the dryer would often terminate prematurely due to clothing not striking the sensor. However, larger loads would be dried to an overdry condition due to their more frequent contact with the sensor. Thus, prior art electronic controls often gave inconsistent results, especially in the damp dry cycle. Prior art control systems also typically based the cool down operation on a thermostat in the exhaust duct of the dryer. This often led to termination of the cool down operation before the clothing was completely cooled to room temperature. With new permanent press fabrics which must be completely cooled before the drum stops rotating to prevent wrinkles, more precise control over the length of the cool down operation is desirable.

SUMMARY OF THE INVENTION

Briefly, the present invention is directed to the use of an electronic control circuit which senses a fixed amount of moisture retention within a material being dried and generates a control signal in response thereto. The control system incorporates a presettable timer having a plurality of sequential cycles of operation in conjunction with the electronic control circuit which is rendered operative or disabled by a novel circuit arrangement which incorporates a single timer switch associated with the timer motor. Additionally, the control system of the present invention is capable of performing a plurality of different sequential cycles of operation while having a minimum number of components associated therewith.

Accordingly, it is an object of the present invention to provide a control system for a dryer which enables the dryer to have better damp-dry control ability than control systems of the prior art.

Another object of the present invention is to provide a control system for a dryer which has a minimum number of components and is relatively inexpensive to manufacture.

A further object of the present invention is to provide a control system for a dryer which precisely controls the duration of the cool down operation.

Yet another object of the present invention is to provide an electronic control circuit which may be incorporated in a control system for a dryer wherein the electronic control circuit continuously samples the amount of moisture in the material being dried and produces a control signal if the portion of the clothing load striking the sensor reaches a predetermined condition of moisture retention and has the ability to revert back to the sampling state should the moisture retention of another part of the load striking the sensor exceed the predetermined condition.

BRIEF DESCRIPTION OF THE DRAWINGS

FIGURE 1 is a elevational front fragmentary view of a control panel of the dryer showing the control knob thereon used to initiate various cycles of operation of the dryer;

FIGURE 2 is a schematic wiring diagram showing one form of the control system of the present invention;

FIGURE 3 is an alternate arrangement of a control system constructed in accordance with the principles of this invention;

FIGURE 4 shows still another arrangement of a control system constructed in accordance with the principles of this invention; and FIGURE 5 shows yet another alternate arrangement of a control system constructed in accordance with the principles of this invention and incorporates a novel electronic control circuit.

DESCRIPTION OF THE PREFERRED EMBODIMENTS

Throughout the description of the preferred embodiments of the present invention it will be understood that like reference numerals throughout the various views of the drawings are intended to designate similar elements or components.

Seen in FIGURE 1 is a fragment of a control panel 60 which may be used to facilitate selection of the desired cycles of operation of the clothes dryer. The control panel includes a selector knob 61 which may be divided into two or more segments as indicated by reference numerals 62 and 63. Segments 62 and 63 of the control knob 61 correspond to various preselected cycles of operation. For example, segment 62 corresponds to the drying cycle of operation during which clothing within the dryer is tumbled in the presence of a flow of heated air while segment 63 corresponds to the air-fluff cycle of operation during which clothing is tumbled in a flow of cool, unheated air. It will be understood that selector knob 61 may be divided into two or more various cycles of operation as desired.

Each cycle of operation appearing on the selector knob 61 is adjustable with respect to time thereby enabling the operator to preset the duration of the various cycles. For example, should the operator select the dry cycle of operation, selector knob 61 is rotated to the desired condition of dryness indicated by indicia thereon and a timer motor will run for a period of time corresponding thereto after timer operation is initiated by the condition responsive electronic control of this invention. Similarly, should the operator select the air-fluff cycle of operation, the selector knob 61 is rotated so that the desired time, in minutes, is indicated. Duration of the air-fluff cycle is entirely timer controlled as the electronic control of this invention is not operative during this cycle.

For a better understanding of the cooperation of the control knob 61 with that of the control system of the dryer, reference is now made to FIGURE 2. FIGURE 2 shows a control system 66 which includes an electronic control circuit 67. The electronic control circuit 67 generates a control signal in response to sensing a fixed preselected amount of moisture retention in the clothes being dried. The control system 66 is connected to a source of alternating current through a pair of lines $L_1$ and $L_2$ in the conventional manner.

A lamp 68 used to illuminate control panel 60 has one end thereof connected to the line $L_2$ and the other end thereof connected to the movable contactor 69a of a door switch 69. Thus, if the dryer door is opened, contactor 69a will transfer to a stationary contactor 69c and the lamp 68 will remain energized from line $L_1$ even though power is broken to the remainder of control system 66. A drive motor 70 has one end thereof connected to the normally closed contact 69b of the door switch 69 and the other end thereof connected to the line $L_2$. The drive motor 70 includes a run winding 71 and a start winding 72 which is deenergized after the motor reaches a predetermined speed by the transfer of movable contactor 73b from stationary contact 73a to stationary contact 74 of centrifugal switch 73. The run winding 71 of drive motor 70 continues to be energized since movable contactor 73b engages stationary contact 74 upon transfer of centrifugal switch 73. Movable contactor 69a of door switch 69 is connected to line $L_1$ through a timer switch $T_1$ which is closed to energize the motor 70 when the door switch 69 is in the position shown in FIGURE 2, which is its position with the dryer door closed. A normally open push-to-start switch 76 is connected between the centrifugal switch 73 and line $L_2$ to initiate operation of the drive motor and of the electronic control circuit 67.

The electronic control circuit 67 receives power from line $L_1$ through timer switch $T_1$ and door switch 69 when in the closed position. The path to ground for electronic control circuit 67 is completed through line 78, connected to a terminal $EC_4$, centrifugal switch 73 and a line 77 connected to line $L_2$.

A pair of timer switches $T_2$ and $T_3$ are connected to line $L_1$ to sequentially control the application of power therefrom to various components of the control system. Timer switch $T_2$ is connected to a terminal $EC_2$ and to one terminal of a timer motor 80. The other terminal of the timer motor 80 is connected to line $L_2$. Timer switch $T_3$ is connected to a heater 81 which, in turn, is connected to a centrifugal switch 82 operated by drive motor 70 and therefrom to a line $L_3$. Therefore, heater 81 is energized with 240 volts alternating current in the usual manner.

In order to sense the relative dryness of clothing within the dryer, a sensor assembly 54 is provided. Sensor assembly 54 comprises two electrically isolated electrodes positioned within the treatment chamber of the clothes dryer as described in United States application Ser. No. 548,678, filed May 9, 1966, now U.S. Patent No. 3,391,468, and assigned to the assignee of the present invention. The electrodes function to monitor the moisture present in the clothing as it falls against them, thereby bridging the gap from one electrode to the other. If clothing is relatively damp, a low resistance will be sensed between the electrodes whereas dry clothing will effect a high resistance electrical bridge.

One electrode of a sensor 54 is connected to a terminal $EC_3$ of electronic control circuit 67. When the resistance of clothing bridging the gap between the electrodes of sensor 54 reaches a predetermined value corresponding to a predetermined moisture retention of the clothing, circuit 67 will produce a control signal in a manner to be hereinafter described.

According to this invention, the timer motor 80 rotates a plurality of cams (not shown) to operate the timer switches $T_1$–$T_3$. By connecting the timer switch $T_2$ between the line $L_1$ and the terminal $EC_2$ of the electronic control circuit 67, the electronic control circuit can be rendered ineffective by merely closing switch $T_2$. Therefore, in one cycle of operation as, for example, the drying cycle, the electronic control circuit 67 will be controlled by the sensor 54 to render the timer motor 80 operative upon the sensor sensing a predetermined condition of moisture retention; whereas, in another cycle of operation as, for example, the air-fluff cycle, the timer 80 is operated continuously by closing switch $T_2$ thereby rendering the electronic control circuit 67 ineffective.

The electronic control circuit 67 includes a diode 83 having its anode connected to a terminal $EC_1$ and its cathode connected to a circuit point 84. Also connected to the anode of diode 83 is a reed switch 85 which is actuated by an electromagnetic coil 86 connected in series with a silicon controlled rectifier 87. Diode 83 applies half wave rectified alternating current to a circuit point 84 which is then filtered by a capacitor 88 to provide direct current for operation of the silicon controlled rectifier 87.

A gate de-sensitizing resistor 89 is connected between the gate and cathode electrodes of silicon controlled rectifier 87 thereby preventing false turn on of silicon controlled rectifier 87 by shunting transient voltages to ground. A neon lamp 90 has one lead thereof connected to the gate electrode of silicon controlled rectifier 87 and the other lead thereof connected to one lead of a charging capacitor 91. The other lead of charging capacitor 91 is connected to line $L_2$ through line 78, the centrifugal switch 73 and line 77.

The charging capacitor is connected to the sensor 54 through a resistor 92 which is connected to a terminal $EC_3$. Also connected to the junction of charging capacitor 91 and resistor 92 is a parallel connected combination consisting of a resistor 93 and a diode 94. Resistor 93 provides a charging path for capacitor 91 while diode 94 provides a discharge circuit for capacitor 91 through a resistor 96 after timer contact $T_1$ opens, thereby discontinuing power to electronic control 67. Therefore, the electronic control circuit 67 provides means for charging capacitor 91 in response to the relative moisture retention of the clothes in a dryer and provides means for discharging the capacitor after termination of the dryer's cycle of operation.

In operation, the operator would set the control knob 61 to the desired cycle of operation and to the desired end dryness condition of the clothes within that cycle of operation. For example, the operator may select the dry cycle of operation and may select the end moisture retention of the clothes between very dry and damp-dry. This action causes timer switches $T_1$ and $T_3$ to close while timer switch $T_2$ remains open thereby rendering the electronic control circuit 67 operative to sense the moisture retention of the clothes. With the door switch 69 positioned as shown in FIGURE 2 and timer switch $T_1$ closed depressing the push-to-start switch 76 supplies power to motor 70. As motor 70 comes up to speed, movable contactor 73b of centrifugal switch 73 will then transfer from stationary contact 73a and engage stationary contact 74 and the motor 70 will remain energized through the run finding 71. Transfer of the movable contactor 73b to stationary contact 74 connects the electronic control circuit 67 in parallel with a drive motor through lines 77 and 78. A second centrifugal switch 82, connected in series with the heater 81 and operated by drive motor 70, closes after motor 70 comes up to speed to energize heater 81. This insures that the clothes placed within the dryer will not be scorched due to standing in one position while heat is supplied to the interior of the drying drum as might be the case if a drum drive belt were to break.

The charging capacitor 91 will be charged through the resistor 93 to a voltage level corresponding to the relative resistance exhibited by the clothes bridged across the sensor 54. When the clothes are dried to a predetermined condition of moisture retention the capacitor will charge to a voltage level sufficient to ionization the neon lamp 90 and render silicon controlled rectifier 67 conductive. This action will energize the electromagnetic coil 86 and close the reed switch 85 associated therewith. Since circuit point 84 is supplied with a substantially direct current, the silicon controlled rectifier 87 will remain conductive once it is gated on by the neon lamp 90.

Closure of reed switch 85 energizes the timer motor 80 from line $L_1$ through timer switch $T_1$ and door switch 69 thereby advancing the timer to control the remainder of the drying cycle and sequentially control the auxiliary operations of the control system. For example, after the time motor 80 runs for a period of time determined by the initial setting of control knob 61, timer switch $T_3$ will open thereby deenergizing the heater 81 and placing the control system 66 in the cool down operation. After a predetermined period of time timer switch $T_1$ opens to completely deenergize the control system and terminate the drying cycle. At the end of the drying cycle, charging capacitor 91 will discharge through the diode 94 and resistor 96 to prevent shock to the user should the user inadvertently touch the electrodes forming the sensor 54.

Should the air-fluff cycle of operation be selected on the control knob 61, timer switches $T_1$ and $T_2$ are closed and timer switch $T_3$ remains open. This action will energize the timer motor 80 to cause advancing of the cams associated therewith immediately upon initiation of operation of the control 66 by depressing the push-to-start switch 76. It will be noted that the control system 67 is energized but is rendered ineffective by timer switch $T_2$ connected in shunt relationship with reed switch 85.

Seen in FIGURE 3 is an alternate arrangement of a control circuit constructed in accordance with the principles of this invention and designated generally by reference numeral 66a. Circuit 66a provides the same control over dryer operations as that provided by the FIGURE 2 circuitry; however, minor modifications have been made in the wiring associated with door switch 69, push-to-start switch 76a, timer contact $T_1$ and centrifugal switch 73. Also, the electronic control circuit 67a utilizes a sensing circuit having greater sensitivity than that provided by electronic control circuit 67.

Assuming control knob 61 (see FIGURE 1) is set to the regular dry position, timer contacts $T_1$ and $T_3$ are closed while timer contact $T_2$ remains open. With the door closed, door switches 69 and 69c are in the position shown in FIGURE 3. Dryer operation is now initiated by depressing push-to-start switch 76a. This transfers movable contactor 76a from stationary contact 76b to stationary contact 76d. Power is thereby established from line $L_1$ to motor 70 through contact $T_1$, push-to-start switch 76a, centrifugal switch 73 and door switch 69c. Motor 70 starts and at a predetermined speed movable contactor 73b of centrifugal switch 73 is transferred from stationary contact 73a to stationary contact 74. This switches start winding 72 out of the energization circuit and push-to-start switch 76a may now be released since power is established to run winding 71 from line $L_1$ through contact $T_1$, stationary contact 74, movable contactor 73b and door switch 69c. A centrifugal switch 82 is also closed by motor 70 when said predetermined speed is reached. This supplies power to heat source 81 from line $L_1$ via switch 82 and contact $T_3$. At this time, motor 70 is rotating the dryer's drum and heated air is being drawn therethrough.

Closed centrifugal switch 73 supplies power to the dryer's console light 68 from line $L_1$ via contact $T_1$, stationary contact 74, movable contactor 73b and door switch 69. The dryer's electronic control circuit generally indicated 67a, is energized through terminal $EC_1$ from line $L_1$ through contactor $T_1$, stationary contact 74 and movable contactor 73b. It is noted at this point that timer motor 80 is not advancing since timer contact $T_2$ is open as is a relay actuated contactor 85 whose closure is controlled by electronic control circuit 67a.

AC power delivered to terminal $EC_1$ is half wave rectified by a diode 83 after which it passes through a voltage divider network consisting of a resistor 109 and a resistor 96. The portion of the half wave rectified voltage appearing across resistor 96 is applied to a filter capacitor 88. Thus, a filtered DC voltage appears on line 84.

The DC potential on line 84 is applied to a voltage divider network consisting of the resistors 101 and 102. A relay coil 86 in series with a thyristor 87 is connected in parallel with resistor 102. Thus, with thyristor 87 out of conduction, the voltage at its anode is equal to that dropped across resistor 102. Since this voltage may be quite low, thyristor 87 may be of an inexpensive type, since it is not required to block a high voltage.

A bridge type sensor circuit including the resistors 93, 104 and 105, a diode 103, a charging capacitor 91 and sensor 54 is utilized by electronic control circuit 67a to precisely control termination of the drying operation. Resistor 105 is connected in series with the clothing resistance which is sensed by sensor 54 connected from terminal $EC_3$ to ground. Capacitor 91 is connected to line 84 through resistor 93 and charges at a rate determined by the time constant of resistor 93 in series with capacitor 91. Diode 103 in series with resistor 104 is connected between the junction point of resistor 93 and capacitor 91 to the junction point of resistor 105 and sensor 54. When the voltage across sensor 54 (which is determined by the dampness and hence electrical resistance of the clothing) is less than the voltage across capacitor 91, diode 103 is forward biased and charged is bled from capacitor 91 to ground through sensor 54. If the clothing within the drum is relatively dry, the voltage established across sensor 54 exceeds that of capacitor 91, thereby back biasing diode 103 and charge is not bled from capacitor 91.

Since the tumbling pattern of clothing within the dryer's drum against sensor 54 is random, there must be a time delay in charging capacitor 91 to insure an adequately long sampling period. The circuit described above allows independent control of the capacitor charging circuit consisting of resistor 93 and capacitor 91 and the capacitor discharge circuit consisting of resistor 105 and sensor 54. Thuss, the sampling period determined by resistor 93 and capacitor 91 may be made relatively long, whereas the discharge period determined by the value of resistor 105 and sensor 54 is made relatively short. Thus, when damp clothing contacts sensor 54 for a relatively short period of time, capacitor 91 is discharged in a much shorter period of time than the sampling period determined by resistor 93 and capacitor 91. This circuitry further allows the clothing resistance sensed by sensor 54 to be compared to a resistance (resistor 105) which is of a much smaller value than the charging circuit resistance (resistor 93). Thus, the value of resistor 105 may be tailored to better match the resistance of clothing sensed by sensor 54 than if the resistor 105 also had to serve as the charging circuit resistor for capacitor 91 as has been common practice in prior art dry controls.

As the drying cycle of operation progresses, sensor 54 continuously bleeds charge from capacitor 91 when the clothing striking sensor 54 is damp. As the clothing begins to dry, diode 103 is back biased for increasingly long periods of time and the voltage level on capacitor 91 rises to a point sufficient to ionize a neon lamp 90. A gating pulse is now delivered to thyristor 87 causing it to fire. Firing of thyristor 87 energizes relay coil 86 from line 84 through resistor 101. Relay switch 85 now closes and power from $L_1$ is supplied to timer motor 80 through contact $T_1$, centrifugal switch 73, terminal $EC_1$ and now closed contact 85.

After approximately one minute of run time, timer 80 closes timer actuated switch $T_2$. Machine operation is now totally under timer control since contact $T_2$ continuously energizes timer motor 80 from $L_1$ through timer contact $T_1$ and centrifugal switch 73. Since contact $T_2$ bridges contact 85, electronic control circuit 67a is ineffective in controlling further dryer operation. After a period of time, as determined by the initial setting of control knob 61, timer 80 opens timer contact $T_3$. This de-energizes heat source 81 and the machine enters the cool down operation. During cool down, only motor 70 is energized thereby rotating the dryer's drum and drawing cool air therethrough. After approximately five minutes of cool down, timer switch $T_1$ opens and motor 70 shuts off thereby terminating the drying cycle of operation.

A buzzer 100 is provided to signal termination of the drying cycle. When contact $T_1$ opens, buzzer 100 is energized from $L_1$ through push-to-start switch 76a, stationary contact 74 and movable contact 73b of centrifugal switch 73 and the motor's rung winding 71 until such time as motor 70 coasts down to a speed at which movable contactor 73b transfers to stationary contact 73a. This transfer is effected approximately three seconds after timer contact $T_1$ opens and thus buzzer 100 emits an audible tone for the three second period at the end of the drying operation.

If the air-fluff operation had been chosen on timer dial 61 (see FIGURE 1) at the initiation of the drying cycle, timer contact $T_3$ would be open and timer contact $T_2$ would be closed. This would prevent heat source 81 from being energized, thereby insuring the air-fluff cycle. Closure of timer contact $T_2$ shorts relay contact 85, rendering electronic control circuit 67a ineffective in controlling dryer operation. Timer 80 continues to run through timer contact $T_2$ for a period of time determined by the initial setting of dial 61 after which all dryer operation is terminated. Seen in FIGURE 4 is an electronic control 66b which is substantially the same as that shown in FIGURE 3 with the exception that an alternate arrangement of an electronic control circuit is shown and designated generally by reference numeral 67b. Electronic control circuit 67b includes a voltage dropping resistor 109 which is connected in series with the diode 83 and the circuit point 84. The filter circuit comprising capacitor 88 and resistor 96 is substantially the same as that shown in FIGURES 2 and 3.

A second diode 110 has its anode connected to the terminal $EC_1$ and its cathode connected to a resistor 111 which, in turn, is connected to the charging capacitor 91 and the sensor 54. A resistor 112 has one end thereof connected to the junction between capacitor 91 and resistor 111 and the other end thereof connected to the neon lamp 90. Also connected to the neon lamp 90 is a diode 113 which has its cathode connected to the anode of silicon controlled rectifier 87 through a resistor 114. The silicon controlled rectifier 87 receives power from the circuit point 84 through a resistor 116. Shunting the silicon controlled rectifier 87 and resistor 114 is a capacitor 117 which serves to prevent transients from inadvertently rendering the silicon controlled rectifier 87 conductive during the operation of the control system 66b.

A pair of diodes 118 and 119 have their anode and cathode respectively connected to the terminal $EC_2$. The diode 118 has its cathode connected to the anode of silicon controlled rectifier 87 through the resistor 114 while the diode 119 has its anode connected to line $L_2$ through the terminal $EC_4$.

The electronic control circuit 67b of FIGURE 4 utilizes the fact that timer motors will not operate when energized by half wave rectified alternating current. Accordingly, upon energization of the electronic control circuit 67b, current will flow through the timer motor 80 and through the diode 119 during negative half cycles while no current will flow through the timer motor 80 during positive half cycles due to the reverse-biasing of diode 119. However, upon the sensor 54 sensing the desired predetermined condition of moisture retention of the clothes within the receptacle, the neon lamp 90 will render silicon controlled recifier 87 conductive to provide a current path through diode 118 and the silicon controlled rectifier 87 during positive half cycles thereby energizing the timer motor 80 with full wave alternating current which will render it operative.

Note that once silicon controlled rectifier 87 is gated on, it will remain in conduction during the negative voltage swing of the alternating current applied between lines $L_1$ and $L_2$ since its anode is supplied with DC potential from a supply consisting of diode 83, capacitor 88, and resistors 96 and 109 and the negative going portion of the alternating current is blocked from its anode by diode 118. When the alternating current voltage again swings positive, silicon controlled rectifier 87 will supply the positive going portion of the alternating current to timer motor 80 through a diode 118.

It will again be noted that timer switch $T_2$ is connected in circuit with the electronic control circuit 67b and the timer motor 80 to render the timer motor 80 operative upon closure thereof and effectively disable the operation of the electronic control circuit. It will be understand that the various cycles of operation of the control system 66b may be identical to that described hereinabove in regard to control system 66a.

Seen in FIGURE 5 is an alternate arrangement of a control system constructed in accordance with the principles of this invention and is designated generally by reference numeral 66c. The operation of the control system 66c is substantially the same as that shown in FIGURES 3 and 4 and the circuit arrangement is substantially the same as that shown on FIGURE 3 with the exception of the electronic control circuit. The electronic control circuit of FIGURE 5 is designated generally by reference numeral 67c. To facilitate the understanding of the electronic control circuit 67c the sensor 54 and timer $T_2$ are shown as part of the electronic control circuit.

The electronic control circuit 67c includes a diode 120 connected in parallel with a resistor 121 of a low ohmic value which forms an energization path for the timer motor 80. A silicon controlled rectifier 122 in series with timer switch $T_2$ is connected in parallel with the timer motor 80. A resistor 123 is connected between the cathode and gate electrodes of the silicon controlled rectifier 122 and to one end of the neon lamp 90. The other end of the neon lamp 90 is connected to the sensor 54 through a resistor 124. Also connected to the sensor 54 is a charging capacitor 126 and a resistor 127.

According to the present invention, charging capacitor 126 may be of a relatively small value, for example, less than .5 microfarad since it either fires or does not fire silicon controlled rectifier 122 each half line cycle depending on the moisture present in clothing striking sensor 54 rather than integrating current pulses applied thereto over many line cycles. This feature greatly reduces the cost of the electronic control circuit as well as simplifies the overall scheme thereof.

In operation, when the selector knob 61 is placed in the automatic cycle of operation, timer switch $T_2$ is closed as well as timer switches $T_1$ and $T_3$. This action renders silicon controlled rectifier 122 conductive during each negative half cycle due to the sensor 54 sensing the wetness of the clothes within the dryer. Conduction of silicon controlled rectifier 122 provides a shunt current path for timer motor 80 thereby maintaining the timer motor inoperative. As the sensor 54 is connected in series with the charging capacitor 126, wet clothes bridging the sensor will cause the capacitor 126 to charge quickly and render silicon controlled rectifier 122 conductive. On the other hand, as the clothes within the dryer become more dry capacitor 126 receives less of a charge until the neon lamp 90 is no longer energized. This action maintains a silicon controlled rectifier 122 non-conductive thereby allowing both positive and negative cycles of the alternating current voltage to pass through the timer motor 80 and advance the timer sequencing cams associated therewith to control the timer switches $T_1$–$T_3$.

Control system 67c provides continuous sampling of the clothes within the dryer and will alternately render the timer motor operative and inoperative depending upon the moisture retention of the portion of the clothes engaging the sensor 54. That is, should the portion of the clothes engaging the sensor 54 be sufficiently dry to not allow charge to build up on the charging capacitor 126, the timer motor will advance due to the non-conduction of silicon controlled rectifier 122. On the other hand, should wet clothes again engage the sensor 54 thereby allowing capacitor 126 to receive sufficient charge to ionize the neon lamp 90, timer motor 80 will again be disabled due to the conduction of silicon controlled rectifier 122.

Although minor modifications might be suggested by those versed in the art, it should be understood that I wish to embody within the scope of the invention warranted hereon all such modifications as may reasonably and properly come within the scope of my contribution to the art.

The embodiments of the invention in which an exclusive property or privilege is claimed are defined as follows:

1. A control system for a dryer of the type including sensing means positioned within a receptacle and engageable with the material being dried to sense a predetermined condition of moisture retention, the improvement therein comprising:

an electronic control circuit connected to said sensing means to provide a control signal when the material in the receptacle reaches a predetermined condition of moisture retention; selectable timer means having a plurality of preprogrammed cycles of operation, said timer means connected in circuit with said electronic control circuit to be rendered operative in response to said control signal when said timer means is in one cycle of operation, and switch means operated by said timer means and connected in circuit with said electronic control circuit to disable said electronic control circuit and render said timer means operative when said timer means is in another cycle of operation.

2. A control system for a dryer according to claim 1 wherein said switch means is in parallel circuit relation with said electronic control circuit, said switch means being open when said timer means is in said one cycle of operation and closed when said timer means is in said other cycle of operation.

3. A control system for a dryer according to claim 1 wherein said switch means is in series circuit relation with said electronic control circuit, said switch means being closed when said timer means is in said one cycle of operation and open when said timer means is in said other cycle of operation.

4. A control system for a dryer according to claim 1 wherein said electronic control circuit includes a charging capacitor connected to said sensor whereby said sensor controls the voltage level on said capacitor in response to the relative moisture retention of the material being dried; a silicon controlled rectifier having its anode connected to a source of voltage; a neon lamp having two terminals, one of said terminals connected to said charging capacitor and the other of said terminals connected to the gate electrode of said silicon controlled rectifier; whereby, ionization of said neon lamp in response to said predetermined condition of moisture retention will render said silicon controlled rectifier conductive thereby initially rendering said timer means operative in response to said control signal when said timer means is in said one cycle of operation.

5. A control system for a dryer according to claim 1 wherein said electronic control circuit includes a charging capacitor connected to said sensing means whereby said sensing means controls the charge level on said capacitor in response to the relative moisture retention of the material being dried; a silicon controlled rectifier having its anode connected to a voltage source; a neon lamp having two terminals, one of said terminals connected to said charging capacitor and the other of said terminals connected to the gate electrode of said silicon controlled rectifier; whereby, ionization of said neon lamp in response to the moisture retention of the material being dried will render said silicon controlled rectifier conductive thereby maintaining said timer means inoperative until said predetermined condition of moisture retention is sensed.

6. A control system for a dryer according to claim 1 wherein said electronic control circuit includes a silicon controlled rectifier connected in parallel with said timer means and in series with said switch means, said silicon controlled rectifier being arranged for connection to a source of alternating current, and said sensor is connected with the gate to cathode junction of said silicon controlled rectifier to cause conduction thereof during alternate half cycles of said alternating current applied to the anode of said silicon controlled rectifier when said switch means is closed to provide a shunt current path around said timer means when the moisture retention of the material being dried is greater than said predetermined condition of moisture retention.

References Cited

UNITED STATES PATENTS

| 3,248,799 | 5/1966 | Worst | 34—45 |
| 3,335,501 | 8/1967 | Janke et al. | 34—45 |
| 3,394,465 | 7/1968 | Janke | 34—45 |
| 3,398,460 | 7/1968 | Elders | 34—45 |
| 3,398,461 | 7/1968 | Janke | 34—45 |
| 3,398,462 | 7/1968 | Harter | 34—45 |

EDWARD G. FAVORS, Primary Examiner

U.S. Cl. X.R.

34—53